United States Patent Office 3,314,377
Patented Apr. 18, 1967

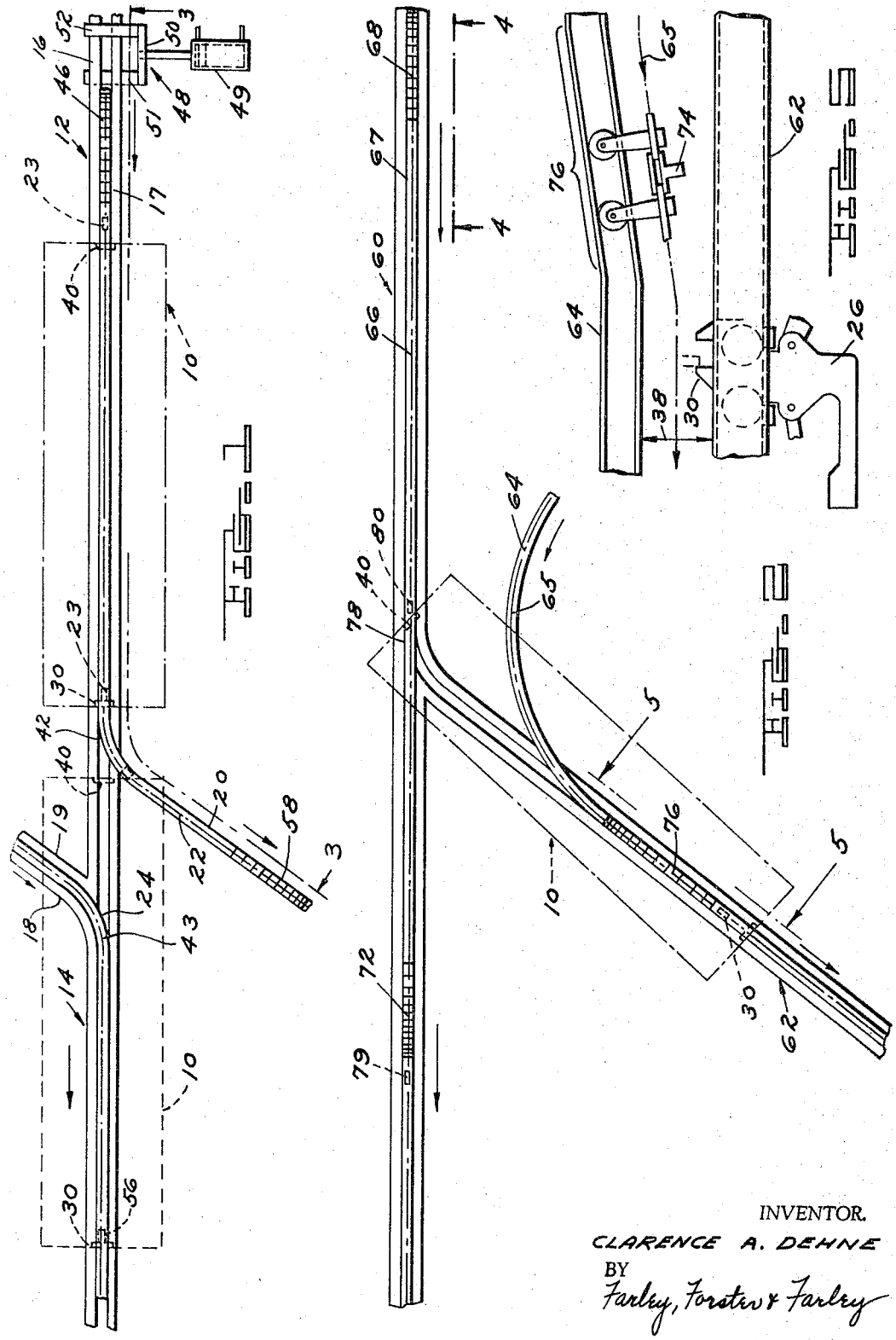

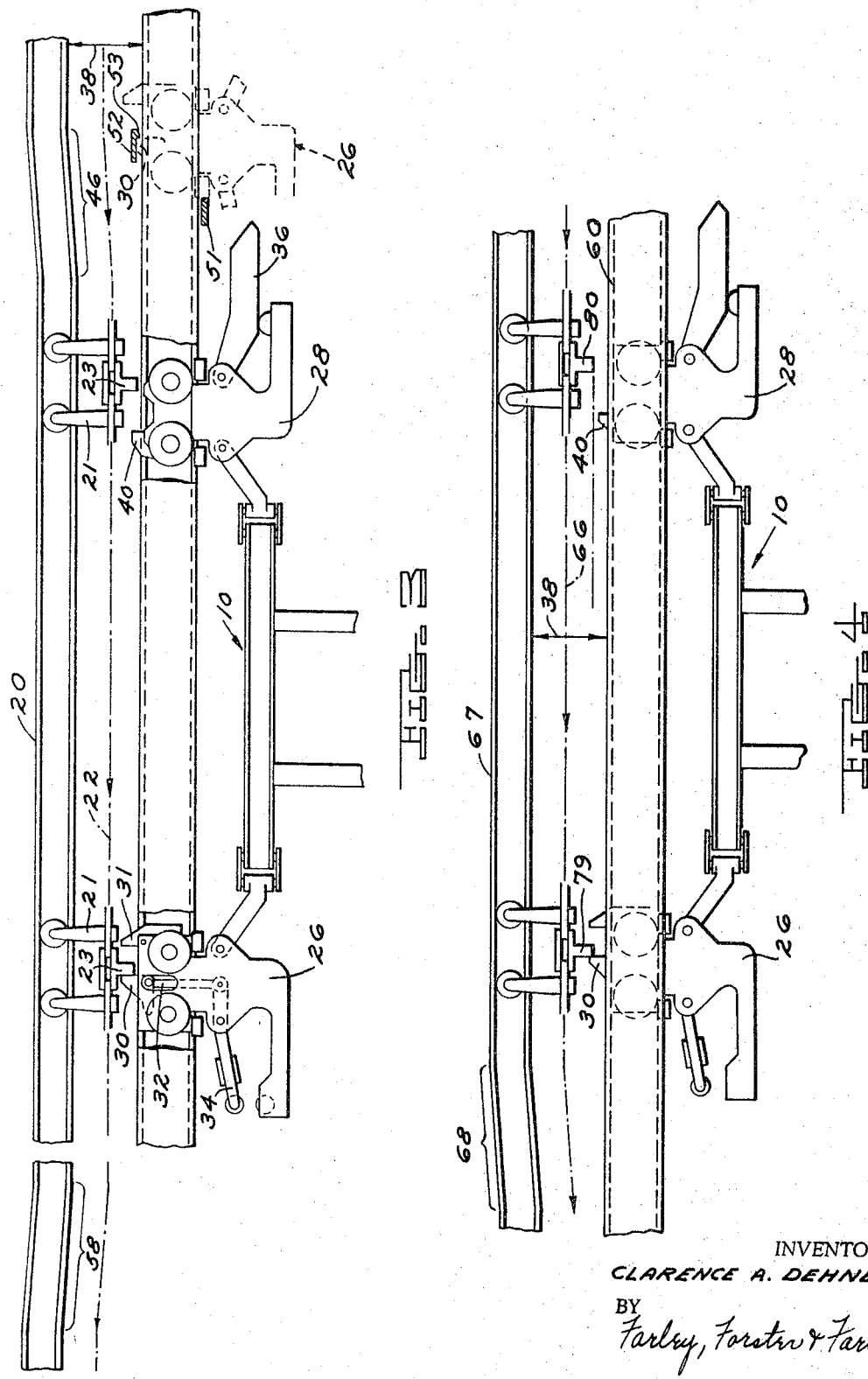

3,314,377
CONSTRUCTION FOR TRANSFERRING A CONVEYOR CARRIER BETWEEN POWER LINES
Clarence A. Dehne, Garden City, Mich., assignor to Jervis B. Webb Company, Detroit, Mich., a corporation of Michigan
Filed Mar. 16, 1962, Ser. No. 180,227
16 Claims. (Cl. 104—96)

This invention is in the field of conveyor systems of the pusher chain type where a carrier is moved along a load-supporting track by a pusher member of a propelling chain carried by a parallel power track and relates to improved constructions for transferring the carrier across a gap in the power track, there being a forwarding propelling chain on one side of the gap and a receiving propelling chain on the other side thereof. The constructions of the invention have particular application to the transfer of a carrier having more than one trolley mounted on the load-supporting track in spaced relation therealong.

In pusher chain conveyor systems it is frequently desirable to transfer a carrier from one propelling chain to another. For example, it may be necessary to positively transfer a carrier under power from a main line to a branch line, from a branch line back to a main line, or from one propelling chain to a different propelling chain along the main line.

The object of the present invention is to provide a construction for accomplishing such a transfer of a carrier having multiple trolleys in which the carrier is positively driven by pushers of a forwarding propelling chain into a position for engagement by a pusher of a receiving propelling chain, which construction is only operative at the gap in the power track, or in other words, in the region of a transfer zone, and imposes no restrictions upon the design of the system or upon operation of any components thereof along portions other than a transfer zone. A further object is to provide a construction by which a carrier can be transferred from a forwarding pusher member to a receiving pusher member regardless of whether the respective propelling chains are operated synchronously or non-synchronously.

According to the invention, a forward trolley of a multiple trolley carrier is provided with a main dog which projects toward the power track a distance such as to be normally engageable by a pusher member thereof, and the means for transferring this carrier across a gap in the power track from a first position where this main dog disengages from a pusher of a forwarding propelling chain to a second position where the main dog is engaged by a pusher on a receiving propelling member includes a supplementary dog mounted on a following trolley of the carrier and projecting toward the power track a lesser distance such as to be normally non-engageable by a pusher member, the supplementary dog trailing the main carrier dog a distance not less than the length of the gap as measured between the aforementioned first and second carrier positions. A drop section is provided in advance of the gap along which the load and forwarding power tracks converge in an amount substantially equal to the difference in the distances to which the main and supplementary dogs project toward the power track whereby when the main dog of the leading trolley proceeds into the gap and loses driving engagement with a forwarding pusher, the supplementary dog is picked up by a following forwarding pusher which advances the carrier across the gap for engagement of the main dog on the forward trolley by a pusher on the receiving power track at the other end of the gap. A rise section is placed following the gap for returning the load and forwarding power track into normal spaced relation.

Hence the supplementary carrier dog is operable only as a transfer dog, or in other words, only following a drop section. As long as the power and load-supporting tracks are in their normal spaced relation only the main dog of the carrier can be engaged by a pusher member. This makes it possible to employ in combination with the main dog, means for moving it to a disengaged position in response to contact between the dog operating member on the carrier trolley and an object such as a stop or a preceding trolley in the path of carrier movement. Intermittent carrier movement can thus be obtained anywhere in the system except at a transfer zone.

Other desirable results include positive control over carrier spacing since only one main dog on each carrier can normally be engaged by a pusher member, and the elimination of restrictions on the radius of curve sections due to the presence of more than one dog on a carrier.

The foregoing and other features and advantages of the invention will be brought out in the following description of the presently preferred representative embodiments thereof disclosed in the accompanying drawings which consist of the following views:

FIG. 1, a partly schematic plan view of a construction for transferring a carrier from a branch line to a main line, operating synchronously therewith;

FIG. 2, a somewhat schematic plan view showing a construction for transferring a carrier from a main line to a non-synchronized branch line;

FIG. 3, an elevation taken substantially as indicated by arrows 3—3 on FIG. 1 showing the power and load-supporting tracks and a carrier;

FIG. 4, an elevation taken as indicated by the arrow 4 of FIG. 2 showing the tracks and carrier relation at the right-hand portion of FIG. 2; and FIG. 5, an elevation showing the track and carrier relation in the region indicated by the arrows 5—5 of FIG. 2.

FIGS. 1 and 3 illustrate a conveyor construction in which a carrier 10 is transferred from a branch pusher chain conveyor line 12 to a main pusher chain conveyor line 14. The branch line 12 includes a load supporting track of channel members 16 and 17 which join with similar track members 18 and 19 of the main line at a conventional junction where a switch (not shown) is installed in the usual manner. An I-beam power track 20 extends above the branch load supporting track, carrying trolleys 21 from which an endless chain 22 having spaced forwarding pusher members 23 is suspended; and an I-beam power track 24 extends above the main load supporting track, the main power track also carrying similar trolleys, chain and receiving pushers. With the present construction it is not necessary to bring the branch power track into juxtaposition with the main power track in order to transfer a carrier under power, and accordingly the branch power track 20 diverges from the load supporting track leaving a gap between the power tracks across which a carrier 10 is to be propelled.

Each carrier 10 as shown in FIG. 3, is supported from a plurality of longitudinally spaced trolleys mounted on the load track, there being two such trolleys for each carrier, a leading trolley 26 and a trailing trolley 28. Leading trolley 26 includes a main driving dog 30 and a hold-back dog 31, the main driving dog 30 being movable between driving and non-driving positions in a vertical slot 32 in the trolley body in response to movement of a pivoted dog operating member 34 which projects forwardly of the trolley body for actuation by an object in the path of trolley movement—either a wayside stop or an actuating device 36 which projects rearwardly from the trailing trolley of a preceding carrier. This releasing dog type of trolley, further described in U.S. Patent 3,044,416, is an optional part of the present construction and one which could not be included in prior double dog transfer arrangements.

Normally, the power tracks 20 or 24 and load track members 16–19 are spaced apart a normal distance as shown in the right hand end of FIG. 3 at 38, and with the tracks at this spacing, the main dog 30 projects toward a power track a distance sufficient to be engageable by one of the pushers 23 in the usual manner. Trailing trolley 28 is provided with a supplementary driving dog 40 which projects toward the power track a distance appreciably less than does the main driving dog 30 so that normally the supplementary driving dog is in clearance or non-driving relation with an advancing pusher 23. Thus, with the power and load-carrying tracks in their normal spacing, the supplementary driving dog 40 performs no function. Its presence does not impose any limitation upon the degree of track curvature; also its presence does not interfere with the start and stop operation of carriers equipped with a releasable main driving dog of the type shown.

Supplementary dog 40 (as far as the present invention is concerned), functions as part of the means for transferring a carrier 10 across the gap in the power track between the location 42 where the forwarding power track 20 diverges from the load track to the location 43 where the load track converges with the receiving power track 24 of the main line 14.

In order to transfer the carrier 10 across this gap, a drop section 46 is provided in the forwarding power track 20 in advance of the gap—the term "drop section" denoting a section along which the forwarding power track and load-carrying track coverage in an amount substantially equal to the difference in the distances to which the main dog 30 and supplementary dog 40 project toward the power track, thereby bringing a pusher member of the forwarding power track close enough to engage a supplementary dog 40 of a carrier. The drop section is located in advance of the gap a distance which is slightly greater than the longitudinal distance between the main and supplementary dogs of the carrier, and in an arrangement such as shown in FIG. 1 where a carrier is being transferred from a branch to a main line, a stop 48 is installed just in advance of the drop section 46, although the stop may be installed intermediate the gap and drop section if desired.

Stop 48 consists simply in an air cylinder 49 connected by suitable structure 50 to reciprocate a pair of stop members—a trolley engaging member 51 extending below the load-carrying track and a dog depressing and holdback member 52 which extends above the load-carrying track. When the stop members are extended across the track as shown in FIG. 1, the trolley engaging member 51 is adapted to be contacted by a trolley 26 as shown in phantom in FIG. 3, while the dog depressing and holdback member 52 is engaged by the driving dog 30 which is thereby moved to non-driving position. A downwardly extending lip 53 on the stop member 52 is positioned rearwardly in the direction of travel of the driving face of the dog 30, thereby preventing backward movement of the carrier. This simple but effective stop device 48 is arranged in a conventional manner for actuation by control elements (not shown) which are located on the main line 14 in advance of the junction and cause actuation of the stop to release position only if an empty pusher member is advancing on the main line.

Transferring operation of the construction in FIGS. 1 and 3 is as follows: Each carrier 10 on the branch line 12 is advanced by a propelling pusher 23 of the forwarding power track 20 until the leading trolley 26 of the carrier engages the stop 48 and is brought to a halt to wait for an advancing empty pusher on the main line 14. Any following carrier on the branch line which overtakes a halted carrier will also be brought to a stop when the operating arm 34 on the following carrier engages the actuating device 36 on the trailing trolley of the halted carrier. When the stop members 51 and 52 are withdrawn from an obstructing position, the halted carrier will then have its main driving dog 30 engaged by the next advancing pusher member 23 which will propel the carrier to the location 42 at the beginning of the gap where the pusher 23 will diverge from driving relation with the main driving dog 30. Since the drop section 46 is installed in advance of the main dog disengaging location 42 a distance greater than the spacing between the main and supplementary driving dogs, the latter dog 40 is now in a position for driving engagement by a following pusher 23 as can be seen in FIG. 3 and will be picked up thereby, advancing the carrier across the gap and into a position (shown in dash line, FIG. 1) where the main driving dog 30 is engageable by a pusher 56 on the propelling member of the receiving or main line power track.

In the construction shown in FIG. 1 the forwarding propelling member and receiving propelling member are operated in synchronism so that the relative position between the pushers thereof is established and maintained, and at the junction this relative position will be one where the main driving dog 30 of a transferred carrier will fall in ahead of a pusher 56 on the receiving power line. The main line power and load-carrying tracks are spaced in normal relation so that the supplementary dog 40 ceases to function as soon as it has disengaged from a forwarding pusher.

A rise section 58 is installed on the forwarding power track 20 anywhere desired following the transfer zone for returning the load and forwarding power tracks to their normal spaced relation.

FIGS. 2, 4 and 5 illustrate the application of the invention to a conveyor construction where a carrier is to be transferred from a main line 60 to a branch line 62, branch line 62 being provided with a propelling power track 64 whose receiving propelling chain 65 is not operating in synchronism with the forwarding propelling chain 66 of the main power track 67. The carrier 10 being transferred is the same type as previously described, as can be seen in FIG. 4, and corresponding reference numerals have been used for the various parts thereof.

Transfer is accomplished by again providing a drop section 68 in the forwarding power track 67 at a location in advance of the gap between the forwarding and receiving power tracks an amount slightly in excess of the spacing between the main and supplementary driving dogs 30 and 40 of the carrier. A rise section 72, which is merely a drop section in reverse, is provided following the transfer zone (for returning the load and forwarding power tracks to their normal spaced relation).

Since the receiving propelling member is not operating in synchronism with the forwarding propeller member, a track arrangement such as shown in FIG. 5 is employed to insure that a pusher member 74 on the receiving propelling member 65 will be brought into driving engagement with the main dog 30 of the carrier without jamming. The receiving power track 64 is provided with a merging section 76 along which it converges into normal spaced relation with the load-supporting track from a spacing therewith which is greater than normal an extent sufficient that the pusher member will initially be in clearance or non-driving relation with a main driving dog 30.

A carrier to be transferred from the main line 60 to the branch line 62 advances along the main line until, at the location 78 at the beginning of the gap between the forwarding and receiving power tracks, the main driving dog 30 diverges from the forwarding pusher member 79. Due to the drop section 68, the supplementary dog 40 of the carrier is then picked up by a following pusher 80 which advances the carrier to approximately the position shown in FIG. 2 where the supplementary dog 40 is about to disengage from the following pusher 80, but the main driving dog 30 has been advanced to the other side of the gap and is in position to be engaged by a pusher 74 of the receiving power line as shown in FIGS. 2 and 5.

While preferred embodiments have been described above in detail, it will be understood that numerous modifications might be resorted to without departing from the scope of my invention as defined in the following claims.

I claim:

1. A conveyor system of the type having a load supporting track, a parallel power track in a normal spaced relation therewith and an endless propelling member having pusher members supported by the power track, characterized by the combination of
   (a) carriers each having a plurality of longitudinally spaced trolleys mounted on the load supporting track, a forward trolley of each carrier having a main dog projecting toward the power track a distance such as to be normally engageable by a pusher member thereof, means for moving the main dog to disengaged position in response to contact between a dog operating member on the leading trolley and an object in the path of trolley movement;
   (b) means for transferring a carrier across a gap in the power track from a first position where the main dog disengages from a pusher of a forwarding propelling member to a second position where the main dog is engaged by a pusher on a receiving propelling member comprising
   (c) a supplementary dog mounted on a following trolley of each carrier and projecting toward a power track a lesser distance such as to be normally non-engageable by a pusher member thereof,
   (d) said supplementary dog of a carrier trailing the main dog therof a distance not less than the length of said gap as measured between the said first and second carrier positions,
   (e) a drop section in advance of the gap along which the load and forwarding power tracks converge in an amount substantially equal to the difference in the distances to which the main and supplementary dogs project toward the power track whereby when the main dog of the leading trolley proceeds into the gap and loses driving engagement with a forwarding pusher, the supplementary dog is picked up by a following forwarding pusher which advances the carrier across the gap for engagement of the main dog on the leading trolley by a pusher on the receiving power track at the other saide of the gap, and
   (f) a rise section for returning the load and forwarding power tracks to normal spaced relation.

2. A conveyor system according to claim 1 further characterized by said drop section being located in advance of the gap an extent slightly greater than the distance which the supplementary dog of a carrier trails the main dog thereof.

3. A conveyor system according to claim 1 further characterized by the pushers of the receiving power track being operated in synchronized relation with the pushers of the forwarding power track, said receiving power track being positioned in normally spaced relation with the load track at said second carrier position.

4. A conveyor system according to claim 1 wherein the pushers of said receiving power track are operated in non-synchronized relation with the pushers of said forwarding power track, said receiving power track being arranged, in advance of said second carrier position, at a spacing greater than normal from said load supporting track, said receiving power and load supporting tracks converging to normal spaced relation at said second position.

5. A conveyor system according to claim 1 further characterized by a stop device mounted adjacent the load supporting track in advance of the gap, said stop device including a carrier arresting member, a main dog depressing member and means for moving said members in unison between carrier arresting and carrier releasing positions.

6. A conveyor system of the type having a load supporting track, a parallel power track in a normal space relation therewith and an endless propelling member having pusher members supported by the power track, characterized by the combination of
   (a) a carrier having a plurality of longitudinally spaced trolley mounted on the load supporting track,
   (b) one of said trolleys having a main dog projecting toward the power track a certain distance,
   (c) another of said trolleys having a supplementary dog projecting toward the power track a distance less than said certain distance,
   (d) and means whereby said main and supplementary dogs can be subsequentially engaged by a power track pusher member including a section along which the spacing between the power and load supporting tracks is changed in an amount substantially equal to the difference between said distances.

7. A conveyor system of the type having a load supporting track, a parallel power track in a normal spaced relation therewith and an endless propelling member having pusher members supported by the power track, characterized by the combination of
   (a) carriers each having a plurality of longitudinally spaced trolleys mounted on the load supporting track, a forward trolley of each carrier having a main dog projecting toward the power track a distance such as to be normally engageable by a pusher member thereof,
   (b) means for transferring a carrier across a gap in the power track from a first position where the main dog disengages from a pusher of a forwarding propelling member to a second position where the main dog is engaged by a pusher on a receiving propelling member comprising
   (c) a supplementary dog mounted on a following trolley of each carrier and projecting toward a power track a lesser distance such as to be normally non-engageable by a pusher member thereof,
   (d) said supplementary dog of a carrier trailing the main dog thereof a distance not less than the length of said gap as measured between the said first and second carrier positions,
   (e) said load and forwarding power tracks being arranged in advance of the gap at a spacing such that both the main and supplementary dogs can be sequentially engaged by forwarding pusher members.

8. A carrier for a conveyor system of the type having a carrier supporting track, a power track, and an endless propelling member and pusher members supported by the power track, said carrier having a plurality of trolleys spaced longitudinally of the supporting track, one of the trolleys having a main driving dog projecting toward the power track a certain distance, another of the trolleys having a supplementary driving dog projecting toward the power track a distance less than said certain distance.

9. A carrier according to claim 8 further characterized by means for decreasing the distance to which said main driving dog projects in response to contacts between the carrier and an object in the path of carrier movement.

10. A carrier for a conveyor system of the type having carrier supporting means, a power track, and an endless propelling member and pusher member supported by the power track, said carrier including main and supplementary driving dogs mounted thereon in longitudinally spaced relation with the supplementary driving dog trailing the main driving dog, said main driving dog projecting toward the power track a distance greater than the distance to which said supplementary driving dog projects toward the power track.

11. A carrier according to claim 10 further characterized by said carrier including means for moving said main driving dog to a non-driving position in response to contact between the carrier and an object in the path of carrier movement.

12. A conveyor system of the type having carriers, carrier supporting means along which the carriers travel, a parallel power track in a normal spaced relation therewith, endless propelling means supported by the power track, and pusher and driving members, the pusher members forming part of a propelling means the driving members being mounted on the carriers, characterized by (a) said pusher and driving members being arranged so that each carrier is provided with a leading main driving member and a following supplemental driving member;

(b) said propelling means having a first pusher member engageable with said main driving member at said normal spaced relation of the power track, and a second pusher member trailing said supplemental driving member, said second pusher and supplemental driving members being in non-engageable relation at said normal spaced relation of the power track;

(c) means for disengaging said first pusher and main driving members; and (d) means in advance of said disengaging means for changing the spaced relation between said power track and carrier supporting means a distance sufficient to position said second pusher and supplemental driving members in interengageable relation whereby drive from said propelling means to a carrier can be transmitted through said second pusher and supplemental driving members when said first pusher and main driving members are disengaged.

13. A conveyor system according to claim 12 further characterized by said carrier including means for moving said main driving member to a non-driving position in response to contact between the carrier and an object in the path of carrier travel.

14. A conveyor system of the type having a load supporting track, a power track and an endless propelling member and pusher members supported by the power track, characterized by the combination of (a) carrier each having a plurality of longitudinally spaced trolleys mounted on the load supporting track, (b) a forward one of said trolleys of each carrier having a main dog projecting toward the power track a certain distance, (c) a following one of said trolleys of each carrier having a supplementary dog projecting toward the power track a distance less than said certain distance, (d) means for moving said main dog from driving to non-driving position in response to contact between a carrier and a preceding carrier, (e) and means whereby carriers can be selectively stopped and positively propelled as required throughout the conveyor system including drop and rise sections at selected places in said system along which the spacing between said load and power track is decreased and increased respectively, the spacing between said track following a rise section being such that a pusher member can only engage said main dog in the driving position thereof, the spacing between said tracks following a drop section being such that either of the main and supplementary dogs are engageable by a pusher member, and a carrier stopping device for selectively moving said main dog from driving to non-driving position, the stopping device being mounted adjacent the load supporting track at a location relative to the drop and rise sections where only the main dog in the driving position thereof is engageable by a pusher member.

15. A conveyor system of the type having a carrier support, a track and an endless propelling member and pusher members supported by the track, characterized by the combination of:

drop and rise sections at selected places in the system along which the spacing between the carrier support and the propelling member track is decreased and increased respectively, carriers each having driving means engageable with a pusher member at said increased and decreased spacings, and means effective only at said increased spacing for disengaging the driving means from a pusher member in response to contact between a carrier and a preceding carrier.

16. A conveyor system as claimed in claim 15 wherein the driving means on the carrier includes a main driving dog operatively associated with said disengaging means, and a supplementary driving dog spaced from the propelling member track a greater distance than the main driving dog so as to be engageable by a pusher member only at the decreased spacing between the carrier support and the propelling member track following a drop section.

References Cited by the Examiner

UNITED STATES PATENTS

| 2,586,263 | 2/1952 | Rose | 105—156 |
| 2,619,916 | 12/1952 | Rainier | 104—172 |
| 2,875,704 | 3/1959 | Yates | 104—96 |
| 2,973,721 | 3/1961 | Wagter | 104—94 X |
| 2,987,011 | 6/1961 | Melmer | 104—172 |
| 3,044,416 | 7/1962 | Feibel et al. | 104—172 |
| 3,048,125 | 8/1962 | Burrows | 104—172 |

FOREIGN PATENTS

| 1,202,902 | 7/1959 | France. |
| 823,727 | 11/1959 | Great Britain. |

ARTHUR L. LA POINT, *Primary Examiner.*

F. W. MONAGHAM, J. E. BABER, *Assistant Examiners.*

UNITED STATES PATENT OFFICE
CERTIFICATE OF CORRECTION

Patent No. 3,314,377　　　　　　　　　　　　　　April 18, 1967

Clarence A. Dehne

It is hereby certified that error appears in the above numbered patent requiring correction and that the said Letters Patent should read as corrected below.

Column 3, line 33, for "coverage" read -- converge --; column 6, line 9, for "space" read -- spaced --; line 14, for "trolley" read -- trolleys --; line 21, for "subsequentially" read -- sequentially --; line 66, for "contacts" read -- contact --; column 7, line 12, for "of a" read -- of the --; same line 12, after "means" insert -- and --; line 47, for "carrier" read -- carriers --; column 8, lines 3 and 5, for "track" read -- tracks --.

Signed and sealed this 7th day of November 1967.

(SEAL)
Attest:

Edward M. Fletcher, Jr.

Attesting Officer

EDWARD J. BRENNER

Commissioner of Patents